(12) United States Patent
Gibbs et al.

(10) Patent No.: US 11,584,451 B2
(45) Date of Patent: Feb. 21, 2023

(54) VEHICLE HAVING MULTIFUNCTIONAL TAILGATE

(71) Applicants: Robert J Gibbs, Novi, MI (US); Christopher J Sytek, Auburn Hills, MI (US); Clifford L Eberle, Jr., Clarkston, MI (US); Eric Ghoukasian, Auburn Hills, MI (US); Piyush Agarwal, Rochester Hills, MI (US); Sean E Whelan, Highland, MI (US); David R Parks, Macomb, MI (US); Michael C Gillam, Oxford, MI (US); Paul Van Norman, Fenton, MI (US); Christopher J Duke, White Lake, MI (US)

(72) Inventors: Robert J Gibbs, Novi, MI (US); Christopher J Sytek, Auburn Hills, MI (US); Clifford L Eberle, Jr., Clarkston, MI (US); Eric Ghoukasian, Auburn Hills, MI (US); Piyush Agarwal, Rochester Hills, MI (US); Sean E Whelan, Highland, MI (US); David R Parks, Macomb, MI (US); Michael C Gillam, Oxford, MI (US); Paul Van Norman, Fenton, MI (US); Christopher J Duke, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 103 days.

(21) Appl. No.: 17/158,076

(22) Filed: Jan. 26, 2021

(65) Prior Publication Data

US 2021/0245817 A1  Aug. 12, 2021

Related U.S. Application Data

(60) Provisional application No. 62/971,373, filed on Feb. 7, 2020.

(51) Int. Cl.
*B62D 33/027* (2006.01)
*B62D 33/037* (2006.01)
(Continued)

(52) U.S. Cl.
CPC ..... *B62D 33/0273* (2013.01); *B62D 33/0276* (2013.01); *B62D 33/03* (2013.01); *B62D 33/037* (2013.01); *B60P 1/26* (2013.01)

(58) Field of Classification Search
CPC ............... B62D 33/027; B62D 33/023; B62D 33/0273; B62D 33/03; B62D 33/037;
(Continued)

(56) References Cited

U.S. PATENT DOCUMENTS 3,180,673 A * 4/1965 Wanlass ............... E05B 81/20
296/57.1
5,685,594 A * 11/1997 Harper ............... B62D 33/0273
296/57.1
(Continued)

*Primary Examiner* — Gregory A Blankenship
(74) *Attorney, Agent, or Firm* — Ralph E. Smith

(57) ABSTRACT

A vehicle includes a vehicle body, a door and a handle assembly. A door is coupled to the vehicle body and is pivotable about a horizontal axis between a closed position and a horizontal open position. The door is also pivotable about a vertical axis between the closed position and a vertical open position. The handle assembly includes a housing, a first release switch and a second release switch. The housing extends at least partially into a cavity of the door and includes a lower wall and an upper wall that cooperate to define a pocket. The first release switch is disposed along the upper wall of the housing and is configured to be actuated to pivot the door about the horizontal axis. The second release switch is disposed along the lower wall of the housing and is configured to be actuated to pivot the door about the vertical axis.

19 Claims, 9 Drawing Sheets

(51) Int. Cl.
*B62D 33/03* (2006.01)
*B60P 1/26* (2006.01)

(58) Field of Classification Search
CPC ........ Y10S 292/29; Y10S 292/30; B60P 1/26; E05C 17/36
See application file for complete search history.

(56) References Cited

U.S. PATENT DOCUMENTS

| | | | | |
|---|---|---|---|---|
| 7,699,373 | B2* | 4/2010 | Miller | B60P 3/40 |
| | | | | 296/50 |
| 8,061,753 | B2* | 11/2011 | Papanikolaou | B62D 33/0273 |
| | | | | 296/146.12 |
| 8,246,098 | B2* | 8/2012 | Cheung | B62D 33/0273 |
| | | | | 296/146.12 |
| 8,740,279 | B1* | 6/2014 | McGoff | B62D 33/0273 |
| | | | | 49/168 |
| 9,248,871 | B1* | 2/2016 | Waskie | E05C 17/36 |
| 10,093,362 | B2* | 10/2018 | Estrada | E05B 83/20 |
| 10,358,172 | B2* | 7/2019 | Morley | B62D 33/0273 |
| 10,569,812 | B2 | 2/2020 | Tyagi et al. | |
| 10,731,393 | B2* | 8/2020 | Ihrke | B60J 5/108 |
| 11,014,512 | B2* | 5/2021 | Ledwith | B60J 5/10 |
| 11,325,451 | B2* | 5/2022 | Nania | B62D 33/0273 |
| 2005/0035620 | A1 | 2/2005 | Ichinose | |
| 2021/0245817 | A1* | 8/2021 | Gibbs | B62D 33/0276 |
| 2022/0089227 | A1* | 3/2022 | Sridhar | B62D 33/077 |

* cited by examiner

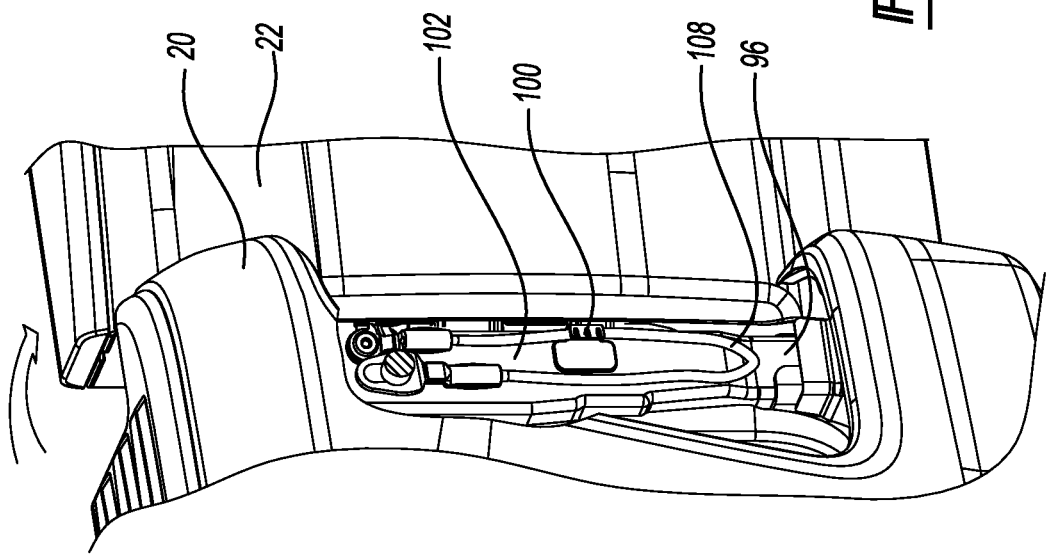
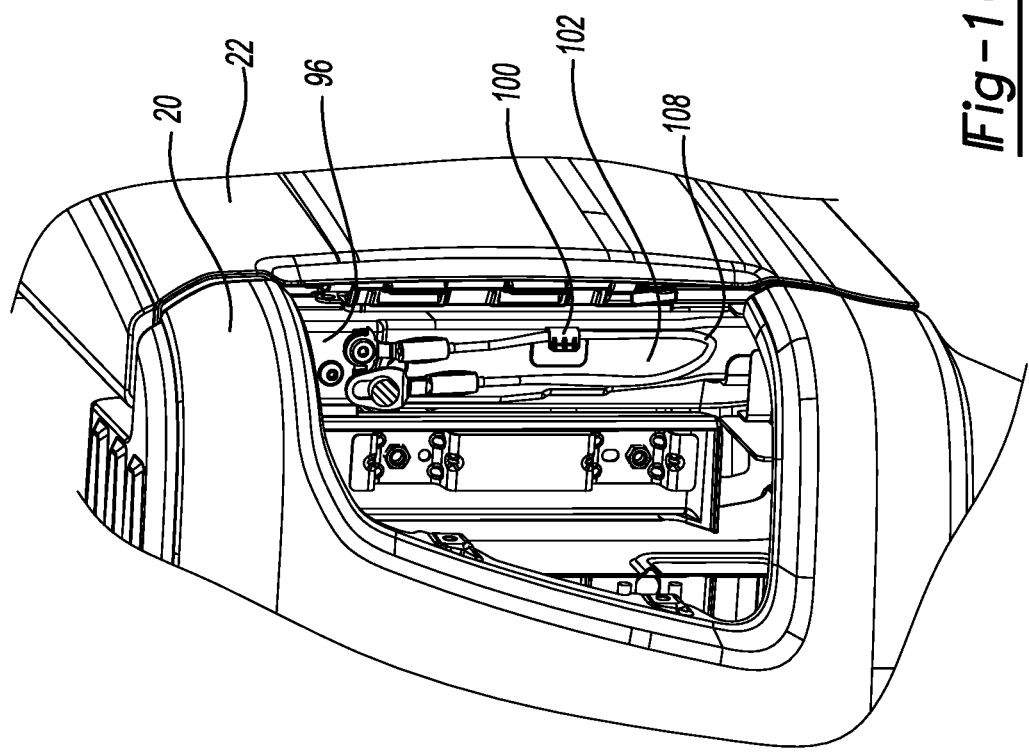

VEHICLE HAVING MULTIFUNCTIONAL TAILGATE

CROSS-REFERENCE TO RELATED APPLICATION

This application claims the benefit of U.S. Provisional Application No. 62/971,373, filed on Feb. 7, 2020. The entire disclosure of the above application is incorporated herein by reference.

FIELD

The present disclosure relates to tailgate for a vehicle, and more specifically to a handle assembly for controlling the opening of a multifunctional tailgate.

BACKGROUND

This section provides background information related to the present disclosure and is not necessarily prior art.

A pickup truck disclosed in U.S. Pat. No. 8,740,279, which issued Jun. 3, 2014 and is incorporated herein by reference in its entirety, includes a multi-functional tailgate spanning a width of the aft end of the cargo bed. The multi-functional tailgate is pivotally coupled to the cargo bed so that the multi-functional tailgate is allowed to pivot about a horizontal axis between a horizontal open position and a closed position. The multi-functional tailgate also includes two doors that can be latched together so as to pivot together between the horizontal open position and the closed position, or unlatched to pivot independently of each other between the horizontal open position and the closed position. When the two doors are unlatched from each other, each door can rotate independently about the horizontal axis (i.e., between the horizontal open position and the closed position) and about a vertical axis (i.e., between a vertical open position and the closed position).

SUMMARY

This section provides a general summary of the disclosure, and is not a comprehensive disclosure of its full scope or all of its features.

The teachings of the present disclosure provide a handle assembly that allows each door to be rotated intuitively and conveniently about the horizontal axis and the vertical axis. The teachings of the present disclosure also provide retention devices that allow for safe stowing of components (e.g., cables) of the tailgate when the tailgate or each door thereof rotates about the horizontal axis and the vertical axis.

In one form, the present disclosure provides a vehicle that includes a vehicle body, a door and a handle assembly. The door is coupled to the vehicle body and pivotable about a horizontal axis between a closed position and a horizontal open position. The door is also pivotable about a vertical axis between the closed position and a vertical open position. The handle assembly includes a housing, a first release switch and a second release switch. The housing extends at least partially into a cavity of the door and includes a lower wall and an upper wall that cooperate to define a pocket. The first release switch is disposed along the upper wall of the housing and is configured to be actuated to pivot the door about the horizontal axis. The second release switch is disposed along the lower wall of the housing and is configured to be actuated to pivot the door about the vertical axis.

In some configurations of the vehicle of the above paragraph, the housing includes a compartment disposed below the pocket. The second release switch separates the pocket and the compartment.

In some configurations of the vehicle of any one or more of the above paragraphs, the second release switch is pivotally coupled to the housing such that the second release switch is at least partially received in the compartment when the second release switch is actuated.

In some configurations of the vehicle of any one or more of the above paragraphs, an end of the second release switch proximate an opening of the pocket extends over the lower wall of the housing.

In some configurations of the vehicle of any one or more of the above paragraphs, the vehicle body includes a cargo bed. The door is coupled to the cargo bed.

In some configurations of the vehicle of any one or more of the above paragraphs, a retention device is coupled to the vehicle body and a cable is coupled to the door and the vehicle body. The cable is movable between an extended position when the door is in the horizontal open position and a stowed position when the door is in the vertical open position. The cable is coupled to the retention device when the door is in the vertical open position to restrict movement of the cable.

In some configurations of the vehicle of any one or more of the above paragraphs, the retention device defines a groove that the cable is partially received in when the door is in the vertical open position to restrict movement of the cable.

In some configurations of the vehicle of any one or more of the above paragraphs, the retention device is U-shaped.

In some configurations of the vehicle of any one or more of the above paragraphs, the vehicle further includes another door coupled to the vehicle body and pivotable independently of the door about another vertical axis between a closed position and a vertical open position. The door includes an inner panel and the another door including another inner panel.

In some configurations of the vehicle of any one or more of the above paragraphs, a bumper feature extends outwardly from the another inner panel and is made of an elastomeric material.

In some configurations of the vehicle of any one or more of the above paragraphs, the bumper feature is configured to contact the door when the door is in the closed position and the another door is pivoted from the vertical open position to the closed position.

In some configurations of the vehicle of any one or more of the above paragraphs, a seal is integral with and extends along a periphery of the inner panel. The seal is sealingly engaged with a periphery of the another inner panel when the door is in the closed position and the another door is in the closed position.

In some configurations of the vehicle of any one or more of the above paragraphs, a seal is integral with and extends along a periphery of the inner panel, the seal is sealingly engaged with the vehicle body when the door is in the closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a partially cut-away perspective view of a retention device coupled to the cargo bed when the other door is in the closed position; and FIG. 11 is a partially cut-away perspective view of a retention device coupled to the cargo bed when the other door is in the vertical open position.

DETAILED DESCRIPTION

Example embodiments will now be described more fully with reference to the accompanying drawings.

Figure 1:
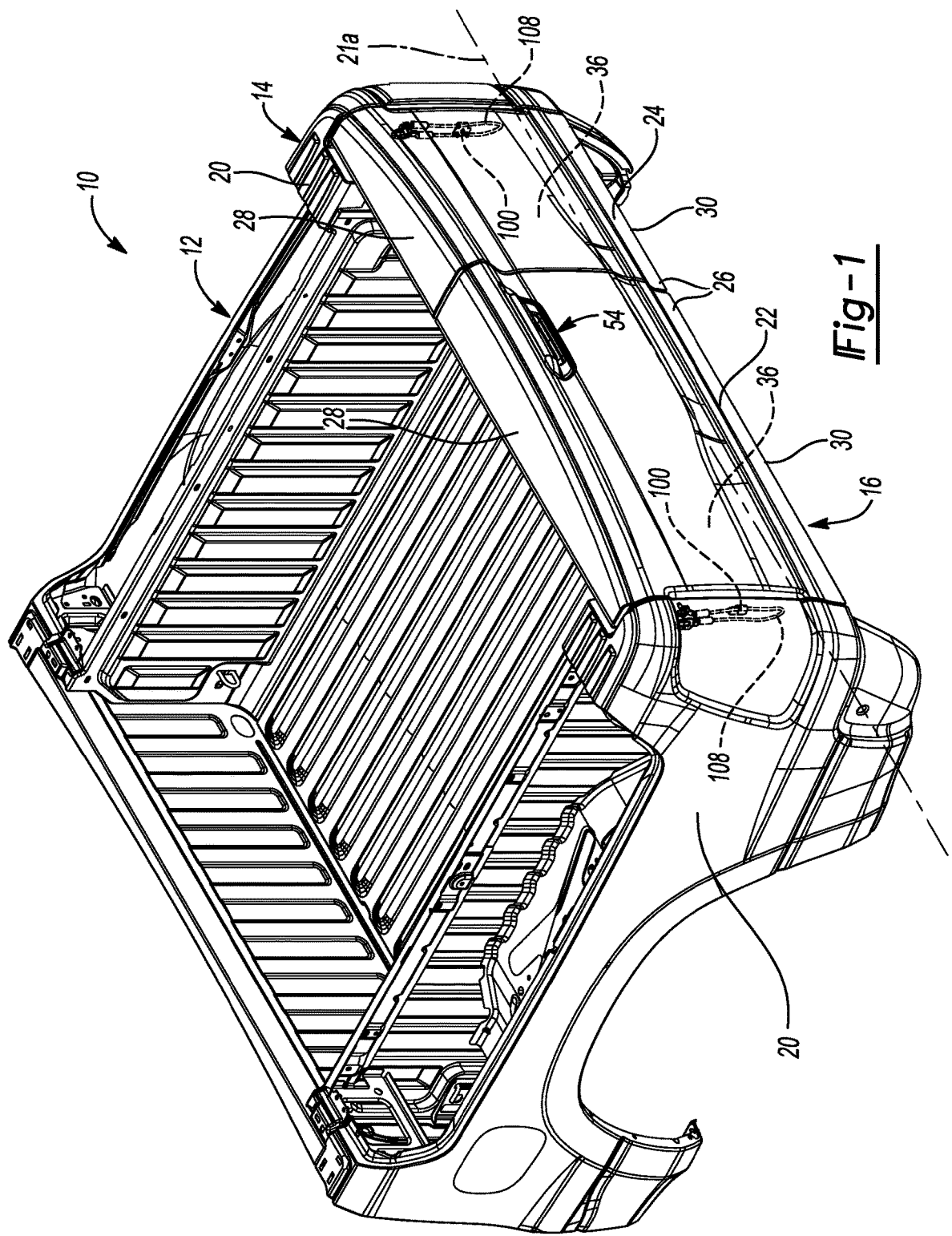
FIG. 1 is a partial perspective view of a vehicle having a cargo bed and a multi-functional tailgate according to the principles of the present disclosure.
Figure 2:
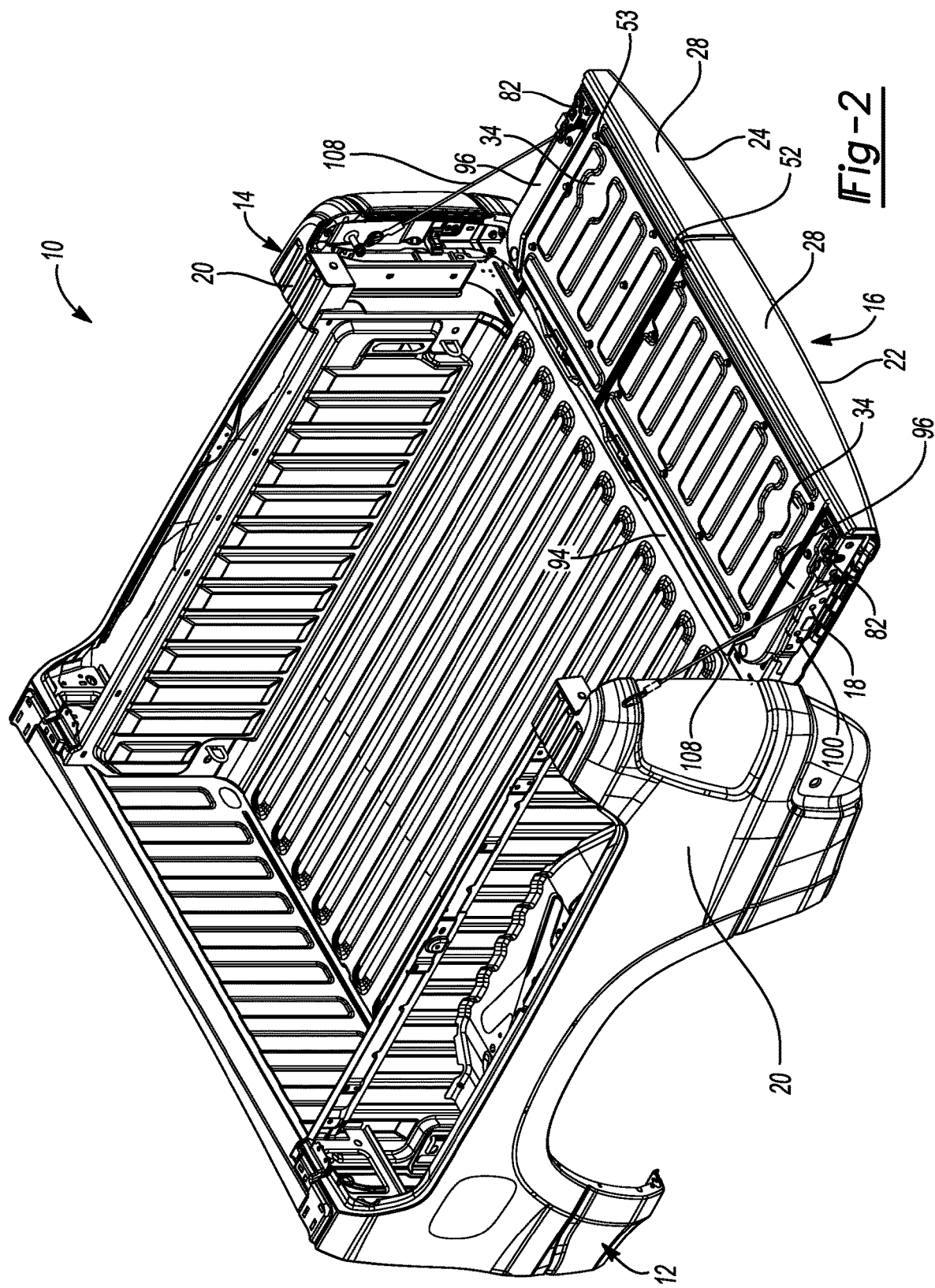
FIG. 2 is a perspective of the cargo bed of FIG. 1 with the multi-functional tailgate in a horizontal open position.

With reference to FIGS. 1 and 2, a vehicle 10 is provided. The vehicle 10 can be similar or the same as the vehicle disclosed in Applicant's commonly owned U.S. Pat. No. 8,740,279, the disclosure of which is incorporated herein by reference. The vehicle 10 include a vehicle body 12. The vehicle body 12 includes a cab (not shown), a cargo bed 14, a multi-functional tailgate 16 and a frame 18 (FIG. 2). The cargo bed 14 is attached to an aft end of the cab and includes sidewalls 20 extending between fore and aft ends of the cargo bed 14.

Figure 3:
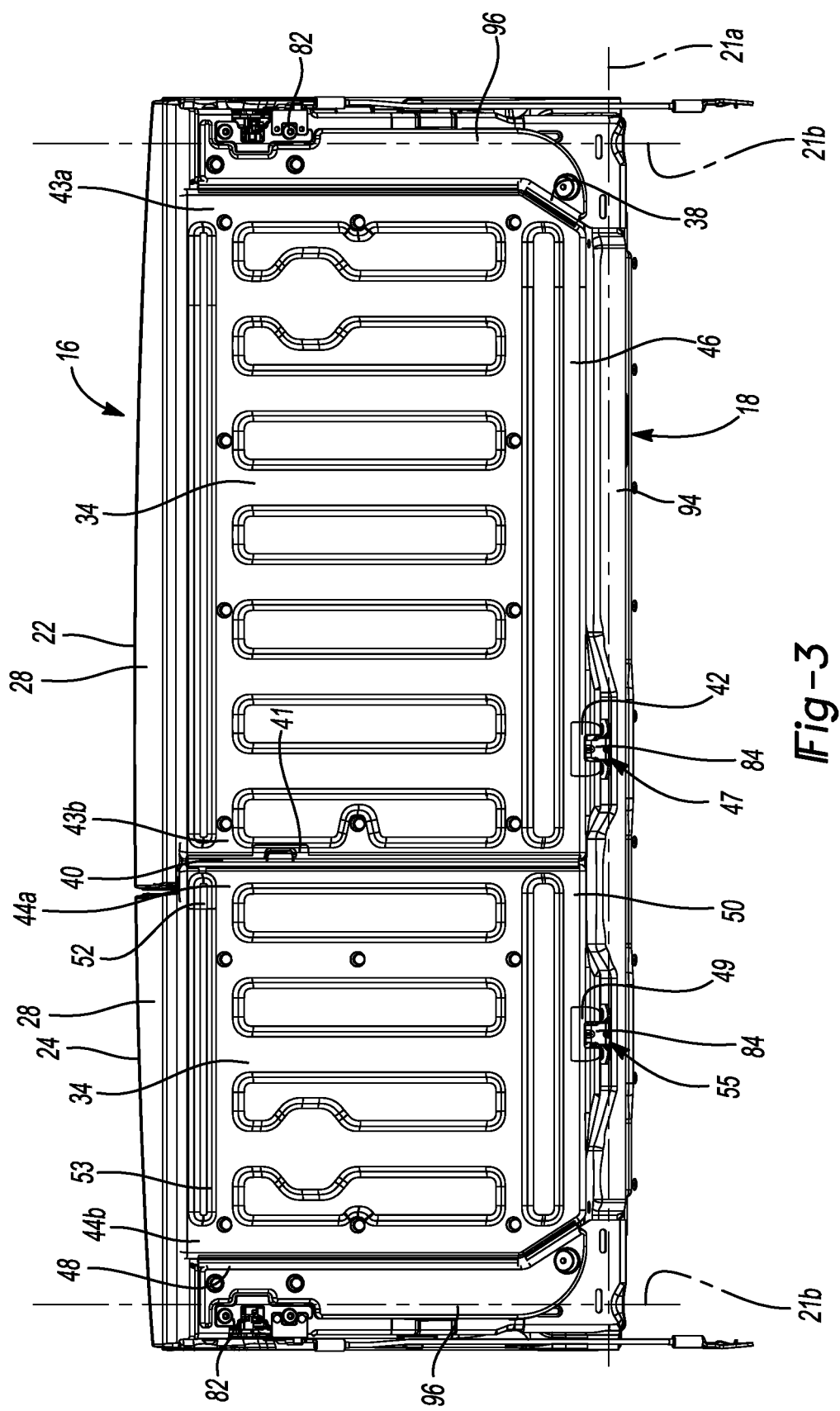
FIG. 3 is a perspective view of a frame of the cargo bed and the multi-functional tailgate.
Figure 4:
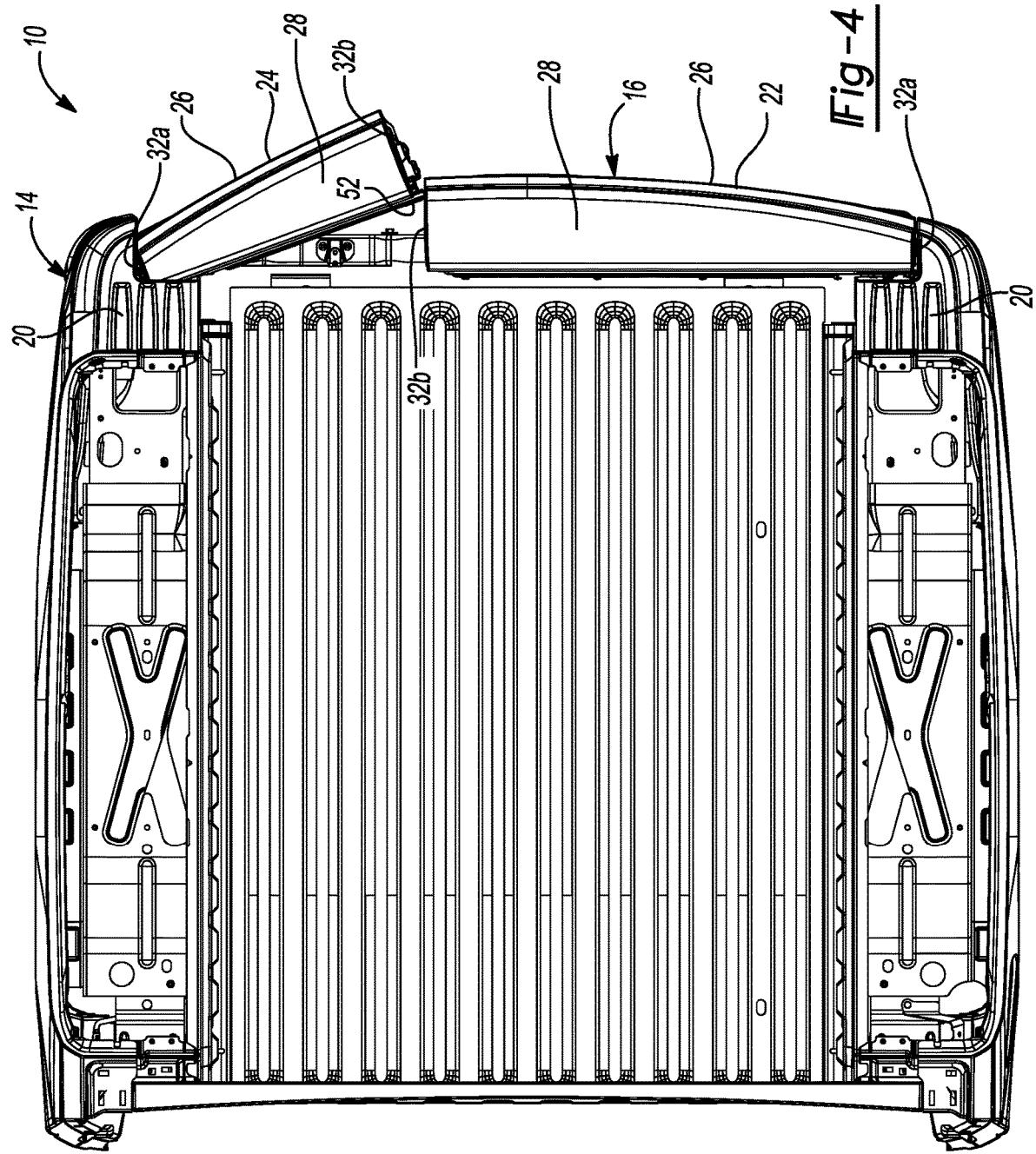
FIG. 4 is a top view of the cargo bed and the multi-functional tailgate with one door of the multi-functional tailgate in a vertical open position and the other door of the multi-functional tailgate in a closed position.
Figure 5:
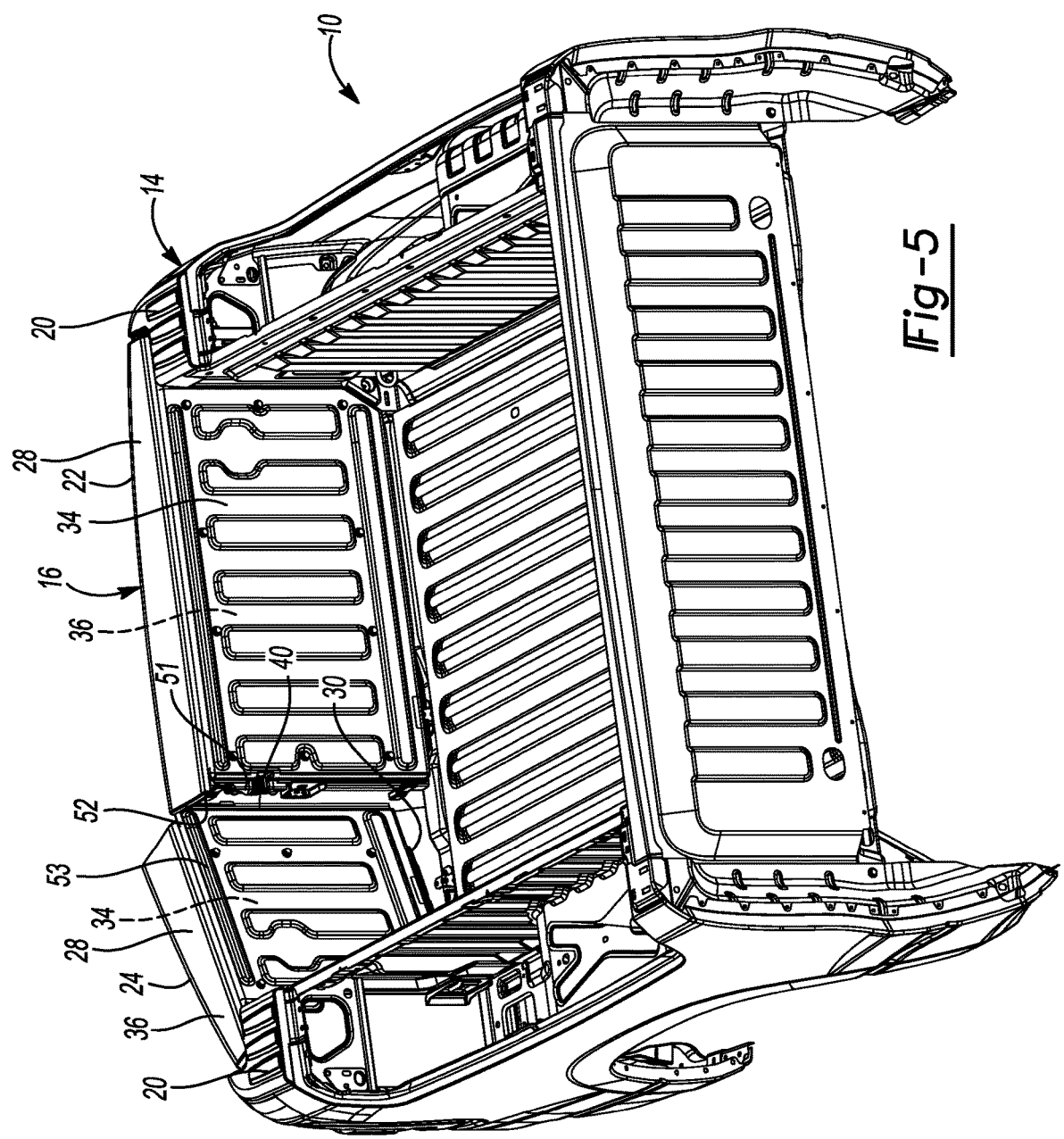
FIG. 5 is a perspective view of the cargo bed and the multi-functional tailgate with the one door of the multi-functional tailgate in the vertical open position and the other door of the multi-functional tailgate in the closed position.
Figure 6:
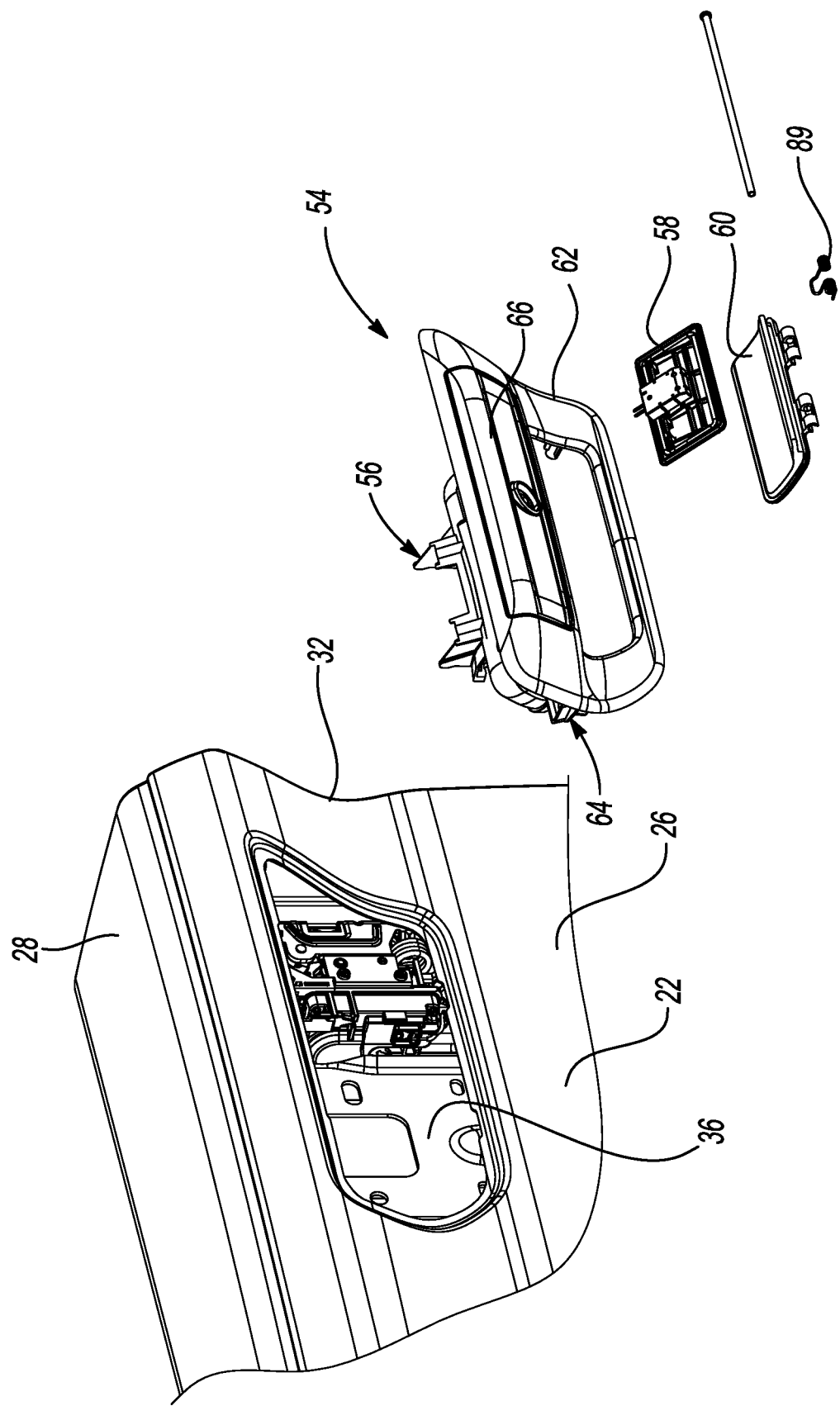
FIG. 6 is an exploded view of a handle assembly of the other door of the multi-functional tailgate.
Figure 7:
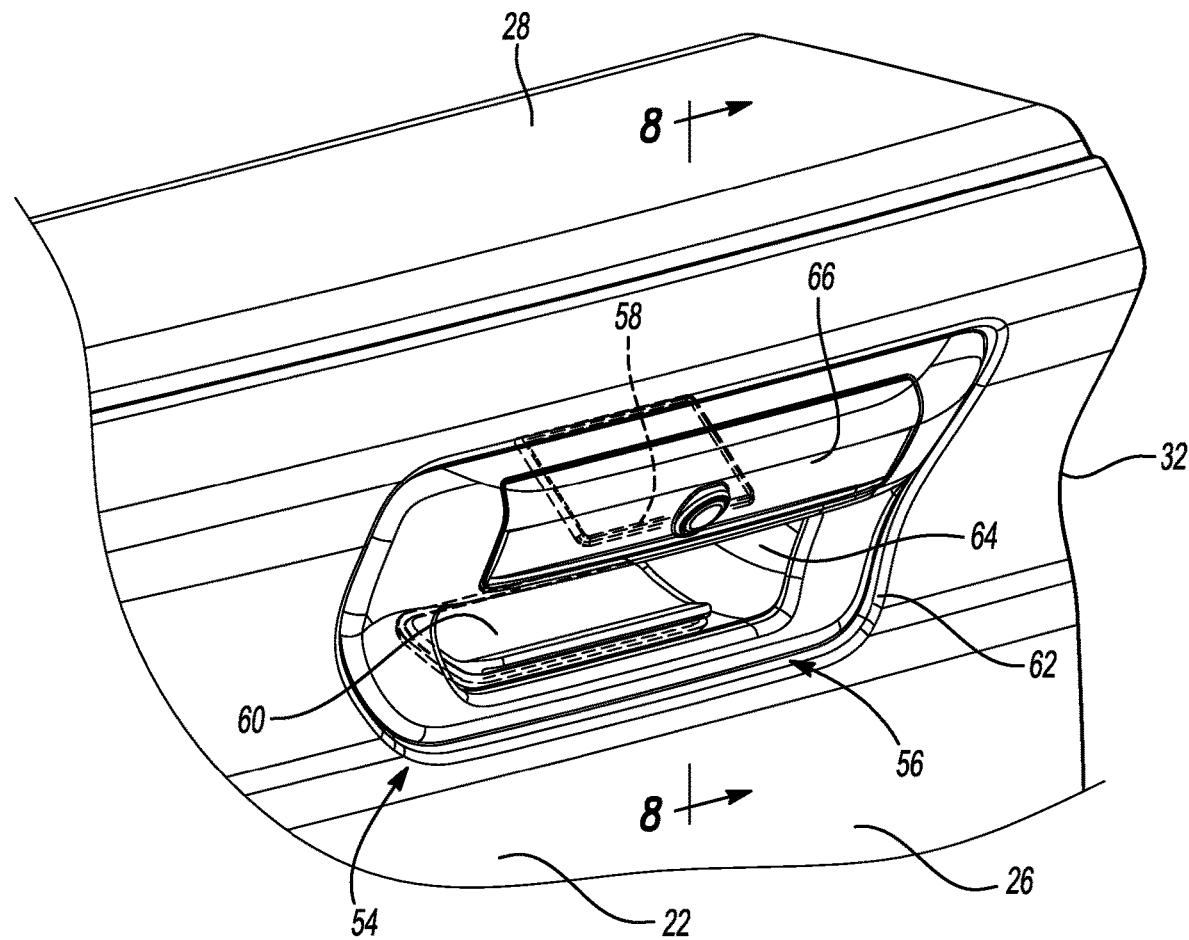
FIG. 7 is a perspective view of the handle assembly coupled to the other door of the multi-functional tailgate.

The multi-functional tailgate 16 spans across the aft end of the cargo bed 14 and is pivotably coupled thereto. The tailgate 16 is pivotable about a horizontal axis 21a between a closed position and a horizontal open position. The multi-functional tailgate 16 includes left and right doors 22, 24. Each door is independently pivotable between the closed position and a vertical open position about respective vertical axes 21b (FIG. 3). In some configurations, each door 22, 24 of the tailgate 16 is independently pivotable between the closed position and the horizontal open position about the horizontal axis 21a.

With reference to FIGS. 1-5, each door 22, 24 includes an outer panel 26, an upper panel 28, a lower panel 30 (FIGS. 1 and 5), side panels 32a, 32b (FIG. 4) and an inside panel (not shown). The panels 26, 28, 30, 32a, 32b cooperate to define a cavity 36 of the door 22, 24. As shown in FIG. 3, an inner panel 34 is coupled to and covers the inside panel of the door 22 and is made of a polymeric material. The inner panel 34 also covers a portion of the panels 28, 30, 32a, 32b and includes a frame seal 38 and first and second latch seals 41, 42. The frame seal 38 is integral with and extends along a side 43a of the inner panel 34. The frame seal 38 is sealingly engaged with the frame 18 when the door 22 is in the closed position to prevent fluid and debris from entering between the inner panel 34 of the door 22 and the frame 18.

The latch seal 41 is integral with the inner panel 34 of the door 22 at the side 43b of the inner panel 34 that is opposite the side 43a, and is sealingly engaged with the inner panel 34 of the door 24 when the doors 22, 24 are in the closed position. In this way, fluid and debris are restricted from damaging components of a latch mechanism 51 (FIG. 5) that couples the doors 22, 24 to each other. The latch seal 42 is integral with the inner panel 34 of the door 22 at a lower end 46 of the inner panel 34 and is sealingly engaged with the frame 18. In this way, fluid and debris are restricted from damaging components of a latch mechanism 47 (FIG. 3) of the door 22.

As shown in FIG. 3, an inner panel 34 is coupled to and covers the inside panel of the door 24 and is made of a polymeric material. The inner panel 34 also covers a portion of the panels 28, 30, 32a, 32b and includes a frame seal 48, a door seal 40 and a latch seal 49. The frame seal 48 is integral with and extends alongside 44b of the inner panel 34 of the door 24 that is opposite side 44a. The frame seal 48 is sealingly engaged with the frame 18 when the door 24 is in the closed position to prevent fluid and debris from entering between the inner panel 34 of the door 24 and the frame 18. The door seal 40 is integral with and extends alongside 44a of the inner panel 34. The door seal 40 is sealingly engaged with a side 43b of the inner panel 34 of the door 22 when the doors 22, 24 are in the closed position to prevent fluid and debris from entering between the doors 22, 24.

The latch seal 49 is integral with the inner panel 34 of the door 24 at a lower end 50 of the inner panel 34 and is sealingly engaged with the frame 18. In this way, fluid and debris are prevented from damaging components of a latch mechanism 55 of the door 24.

As shown in FIGS. 2-5, a bumper feature 52 is made of an elastomeric material (e.g., rubber) and is integral with the inner panel 34 of the door 24. The bumper 52 is, in one example, elastomeric and formed in a second molding process for the inner panel or installed. The bumper feature 52 is also positioned at an end of a projection 53 that extends along a length of the inner panel 34 (an end proximate to the door 22) such that the projection 53 and the bumper feature 52 gives a continuous and natural appearance. The bumper feature 52 is configured to contact the door 22 when the door 22 is in the closed position and the door 24 is pivoted from the vertical open position to the closed position. In this way, the bumper feature 52 made of elastomeric material prevents damage to the door 22 when a user mistakenly moves the door 22 to the closed position prior to moving the door 24 to the closed position. That is, the door 24 should be moved to the closed position prior to moving the door 22 to the closed position to properly latch the doors 22, 24 to each other. It should be noted that the bumper 52 hay be incorporated into doors or positions where two components move relative to each other. That is a first component like the door 22 has a closed and open position and another component such as the door 24 has an open and closed position. When the door 24 is moved into the closed position before the door 24 is attempted to be moved into the closed position, the bumper prevents metal components of the edge of the door 2 from being contacted by components of the door 24 to prevent damage.

With reference to FIGS. 1 and 6-8, a handle assembly 54 is coupled to the door 22 and includes a housing 56, a first release switch 58 and a second release switch 60. The housing 56 is coupled to the outer panel 26 of the door 22 and includes a lip portion 62 and a body portion 64. The lip portion 62 extends around a periphery of the body portion 64 and is coupled to the outer panel 26 of the door 22. A rear view camera assembly 66 is coupled to the lip portion 62 and enables a driver of the vehicle 10 to see behind the cargo bed 14 from inside an occupant cabin (not shown) when the vehicle is shifted into a Reverse operating mode. The rearview camera assembly 66 is above the first release switch 58 and the second release switch 60. The first release switch 58 is above the second release switch. The first release switch is between the rear view camera assembly 66 and the second release switch 60.

Figure 8:
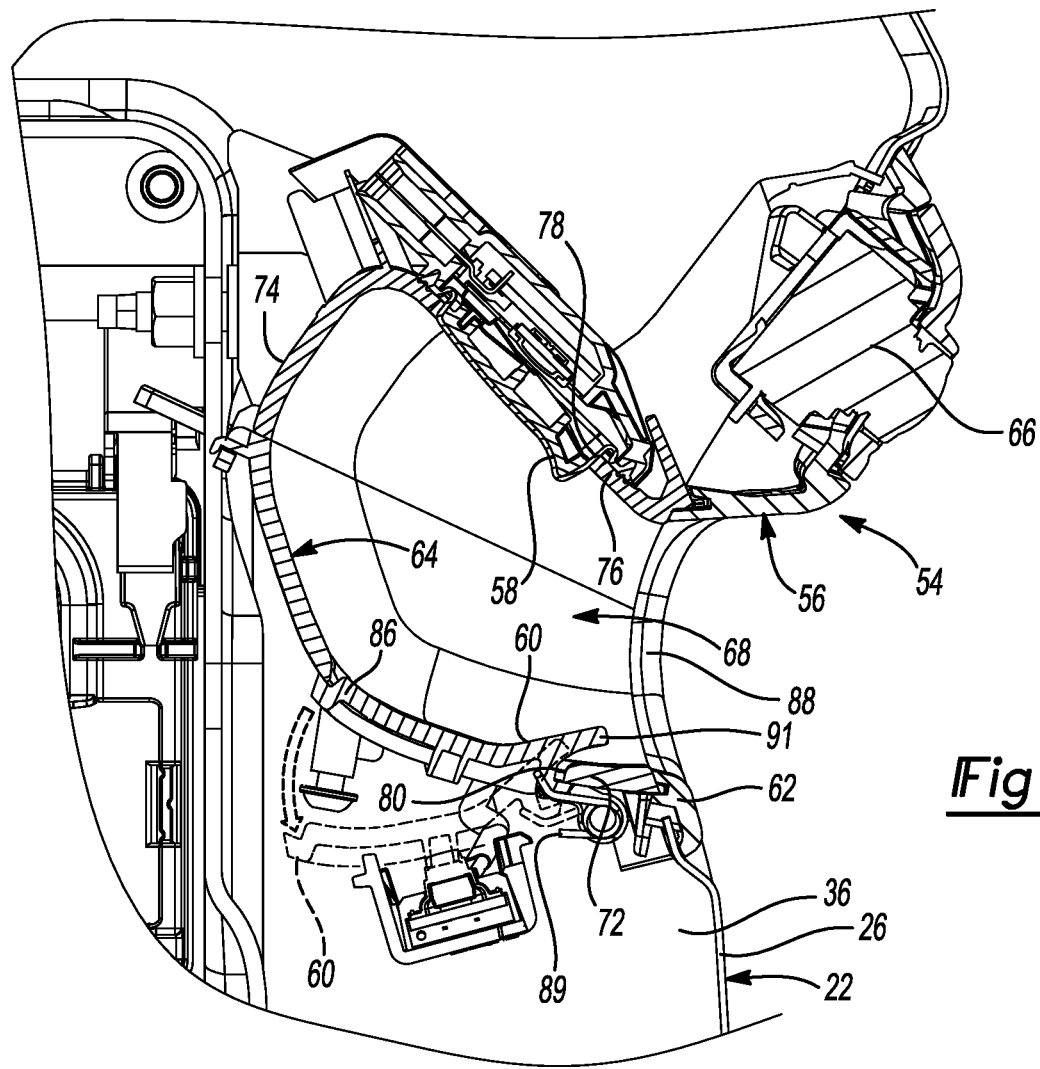
FIG. 8 is a cross-sectional view of the other door taken along line 8-8 of FIG. 7.

As shown in FIG. 8, the body portion 64 extends into the cavity 36 of the door 22 and defines a pocket 68. The pocket 68 of the body portion 64 is defined by a lower wall 72, a back wall 74 and an upper wall 76. The upper wall 76 defines an opening 78 that the first release switch 58 is received in and the lower wall 72 defines an opening 80 that the second release switch 60 is disposed in.

The first release switch 58 is operable to pivot the tailgate 16 from the closed position to the horizontal open position about the horizontal axis 21a when actuated. That is, the first release switch 58 is in communication with latch mechanisms 82 of the frame 18 via one or more wires and/or mechanical linkages, for example, such that the first release switch 58 unlatches the latch mechanism 82 from a striker pin coupled to the cargo bed 14 when actuated, thereby permitting the tailgate 16 to pivot about the horizontal axis 21a from the closed position to the horizontal open position. The first release switch 58 can be a button, handle, lever, switch or any other device operable to pivot the tailgate 16 from the closed position to the horizontal open position when actuated. The positioning of the first release switch 58 along the upper wall 76 of the housing 56 allows the user to intuitively and conveniently pivot the tailgate 16 from the closed position to the horizontal open position when actuating the first release switch 58. The positioning of the first release switch 58 in the pocket 68 and along the upper wall 76 of the housing 56 also protects the first release switch 58 from fluid and debris outside of the pocket 68.

The second release switch 60 is operable to pivot the door 22 from the closed position to the vertical open position about the respective vertical axis 21b when actuated. That is, the second release switch 60 is in communication with the latch mechanisms 47, 51 of the door 22 via one or more wires and/or mechanical linkages, for example, such that the second release switch 60 unlatches the latch mechanisms 47, 51 when actuated, thereby permitting the door 22 to pivot about the respective vertical axis 21b from the closed position to the vertical open position. An end 86 of the second release switch 60 is biased into engagement with the back wall 74 of the pocket 68 via a spring 89. When actuated, the force applied to the second release switch 60 overcomes the biasing force of the spring 89 such that the second release switch 60 pivots in a counter-clockwise direction (with respect to the view shown in FIG. 8) and the end 86 of the second release switch 60 is spaced apart from the back wall 74. An end 91 of the second release switch 60 opposite the end 86 and proximate an opening 88 of the pocket 68 extends over the lower wall 72 of the housing 56 (i.e., the end 91 of the second release switch 60 extends generally upwardly and outwardly toward the opening 88 of the pocket 68).

The second release switch 60 can be a handle, button, lever, switch or any other device operable to pivot the door 22 from the closed position to the vertical open position when actuated. The positioning of the second release switch 60 along the lower wall 72 of the housing 56 allows the user to intuitively and conveniently pivot the door 22 from the closed position to the vertical open position when actuating the second release switch 60. The positioning of the second release switch 60 in the pocket 68 and along the lower wall 72 of the housing 56 also protects the second release switch 60 from fluid and debris outside of the pocket 68.

As shown in FIG. 3, the frame 18 is U-shaped and includes a horizontal section 94 and a pair of vertical sections 96. The horizontal section 94 is rotatably coupled to the cargo bed 14 and defines the horizontal axis 21a. The horizontal section 94 includes the striker pins 84 extending outwardly therefrom. The latch mechanisms 47, 55 of the doors 22, 24, respectively, are configured to latch onto the striker pins 84. When the latch is latched onto the striker pins 84, the doors 22, 24 are prevented from pivoting about the respective vertical axis 21b. When the latch is unlatched from the striker pins 84, the doors 22, 24 are allowed to pivot about the respective vertical axis 21b.

Each vertical section 96 is coupled to opposing ends of the horizontal section 94 and defines the respective vertical axis 21b. Each vertical section 96 includes a hinge and the latch mechanism 82. Each door 22, 24 is pivotably coupled to a respective vertical section 96 via the hinge, thereby allowing the door 22, 24 to pivot about the respective vertical axis 21b. The latch mechanism 82 is configured to latch onto the striker pin extending outwardly from a respective sidewall 20 of the cargo bed 14. When the latch mechanism 82 is latched onto the striker pin, the door 22, 24 is prevented from pivoting about the horizontal axis 21a. When the latch mechanism 82 is unlatched from the striker pin, the door 22, 24 is allowed to pivot about the horizontal axis 21a.

Figure 9:
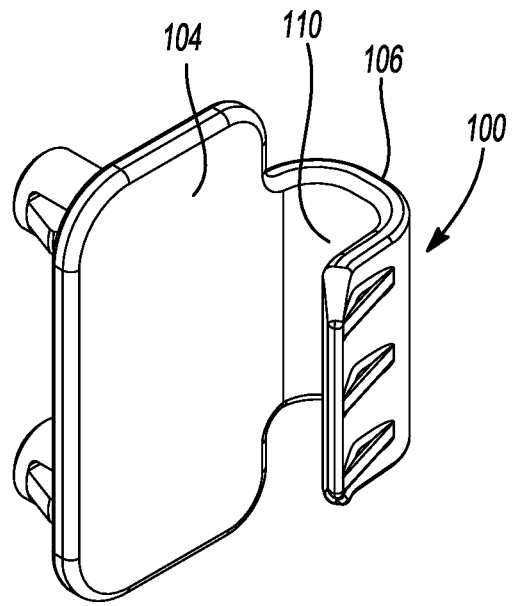
FIG. 9 is a perspective view of one retention device of a pair of retention devices coupled to the cargo bed.

As shown in FIGS. 10 and 11, a closure system for the tailgate has a retention device 100 can be made of a metallic or polymeric material, for example, and is coupled to an outer surface 102 (surface 102 that faces toward the proximate sidewall 20 of the cargo bed 14) of the vertical section 96 of the frame 18. As shown in FIG. 9, the retention device 100 includes a mount portion 104 and a retention portion 106. The mount portion 104 is fixed to the outer surface 102 of the vertical section 96. The retention portion 106 has a U-shape and extends from the mount portion 104. A cable 108 is coupled to the outer surface 102 of the vertical section 96 at one end and is coupled to a stationary portion of the vehicle such as the vehicle sidewall 20 of the cargo bed 14 at the other end. The cable 108 is movable between a deployed position (i.e., extended) and a stowed position. That is, the cable 108 is in the deployed position when the door 22, 24 is in the horizontal open position (FIG. 1), and in a stowed position when the door is in the closed position (or the vertical open position). When the door 22, 24 is in the horizontal open position, the cable 108 coupled to the cargo bed 14 acts as a support for the door 22, 24. When the door 22, 24 is in the closed position (or vertical open position), the cable 108 is received in a groove 110 in the retention portion 106 such that the cable 108 is restricted from movement. In this way, the cable 108 is not visible from behind the cargo bed 14 (i.e., does not stick out through a gap between the vertical section 96 and the sidewall 20 of the cargo bed 14).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a vehicle body;
   a door coupled to the vehicle body and pivotable about a horizontal axis between a closed position and a horizontal open position, the door also pivotable about a vertical axis between the closed position and a vertical open position; and
   a handle assembly including a housing, a first release switch and a second release switch, the housing extending at least partially into a cavity of the door and including a lower wall and an upper wall that cooperate to define a pocket, the first release switch disposed along the upper wall of the housing and configured to be actuated to pivot the door about the horizontal axis, the second release switch disposed along the lower wall of the housing and configured to be actuated to pivot the door about the vertical axis.

2. The vehicle of claim 1, wherein an end of the second release switch is biased into engagement with the housing via a spring with a biasing force prior to the second release switch being actuated.

3. The vehicle of claim 2, wherein when the second release switch is actuated, a force applied to the second release switch overcomes the biasing force of the spring such that the end of the second release switch is spaced apart from the housing.

4. The vehicle of claim 1, wherein an end of the second release switch proximate an opening of the pocket extends over the lower wall of the housing.

5. The vehicle of claim 1, wherein the vehicle body includes a cargo bed, and wherein the door is coupled to the cargo bed.

6. The vehicle of claim 1, further comprising a retention device coupled to the vehicle body and a cable coupled to the door and the vehicle body, and wherein the cable is movable between an extended position when the door is in the horizontal open position and a stowed position when the door is in the vertical open position, the cable is coupled to the retention device when the door is in the vertical open position to restrict movement of the cable.

7. The vehicle of claim 6, wherein the retention device defines a groove that the cable is partially received in when the door is in the vertical open position to restrict movement of the cable.

8. The vehicle of claim 6, wherein the retention device is U-shaped.

9. The vehicle of claim 1, further comprising another door coupled to the vehicle body and pivotable independently of the door about another vertical axis between the closed position and the vertical open position, the door including an inner panel and the another door including another inner panel.

10. The vehicle of claim 9, wherein a bumper feature extends outwardly from the another inner panel and is made of an elastomeric material.

11. The vehicle of claim 10, wherein the bumper feature is configured to contact the door when the door is in the closed position and the another door is pivoted from the vertical open position to the closed position.

12. The vehicle of claim 9, wherein a seal is integral with and extends along a first periphery of the inner panel, the seal is sealingly engaged with a second periphery of another inner panel when the door is in the closed position and the another door is in the closed position.

13. The vehicle of claim 9, wherein a seal is integral with and extends along a periphery of the inner panel, the seal is sealingly engaged with the vehicle body when the door is in the closed position.

14. A vehicle comprising:
   a first moving component comprising a first position and a second position;
   a second moving component comprising a third position and a fourth position, said second moving component comprising an inner panel comprising a bumper, said bumper contacting the first component when the first component is moved to the first position prior to the second component being moved to the third position, and the bumper being molded into the inner panel.

15. The vehicle of claim 14 wherein the first moving component comprises a first door and the second moving comprises a second door.

16. The vehicle of claim 15 wherein the first door comprises a first portion of a tailgate and the second door comprises a second portion of a tailgate.

17. A closure system comprising:
   a tailgate having an outer surface facing laterally outward and an inner surface extending orthogonal to the outer surface, the tailgate movable from an open position and a closed position;
   a cable comprising a first end fixedly coupled to a vehicle structure and a second end coupled to the outer surface of the tailgate; and
   a retention device coupled to the outer surface, the retention device comprising a mount portion coupled to the outer surface and a retention portion extending therefrom, the retention portion comprising a groove for receiving the cable when the tailgate is moved from the open to the closed position,
   wherein the groove is entirely open in a direction that faces the inner surface such that when the tailgate is moved to the open position the cable is released from the groove.

18. The closure system as recited in claim 17 wherein the vehicle structure comprises a sidewall of a cargo bed.

19. The closure system as recited in claim 17 wherein the retention portion comprises a U-shape.

* * * * *